Patented Feb. 13, 1934

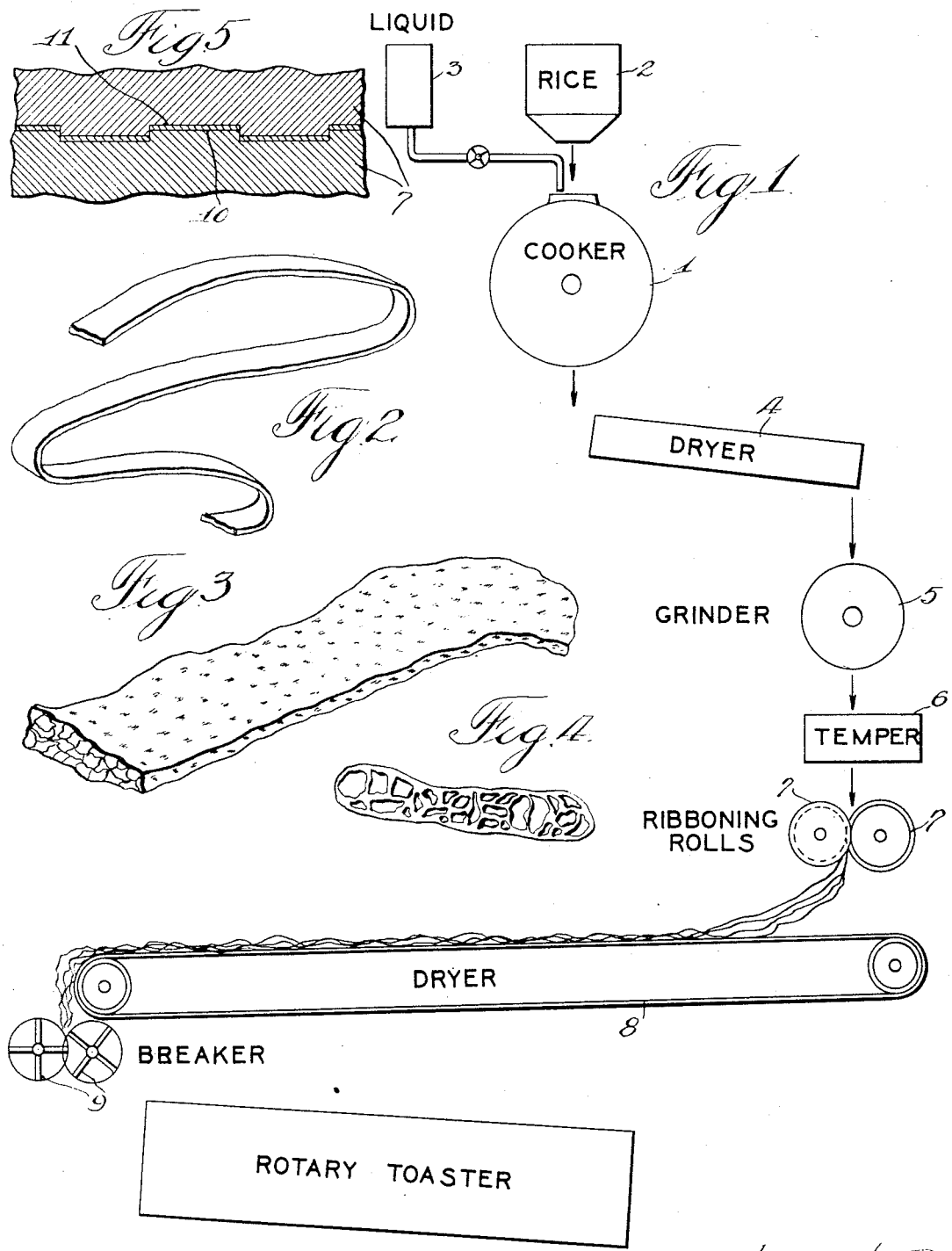

1,946,803

UNITED STATES PATENT OFFICE 1,946,803

CEREAL FOOD

Eugene H. McKay, Battle Creek, Mich., assignor to Kellogg Company, Battle Creek, Mich., a corporation of Delaware Application April 15, 1929, Serial No. 355,132
Renewed September 27, 1933

5 Claims. (Cl. 99—10)

My invention relates to cereal foods and more specifically to a rice food in the form of long flat ribbons.

One of the objects of this invention is to provide a new ready-to-eat rice food formed in the process of manufacture in the shape of long, flat ribbons which are subsequently broken up into ribbon-like fragments and puffed and toasted.

A further object of the invention is to provide means for producing a rice food of a flatlike, puffed up or bubbly structure without the necessity for manufacturing the food from large individual kernels of rice.

One method heretofore employed for making puffed units of food is by the well-known method of flaking individual kernels or grits. In this method the individual kernels are flaked or flattened into flakes which are subsequently toasted, puffed or otherwise treated to provide the final product. The disadvantage of this method is that it requires the use of large individual kernels or grits, as they are called, to produce flakes of satisfactory size. Rice kernels are naturally small and thus by the method referred to the size of the final flakes prepared from such rice is limited. Furthermore, great quantities of small-kernel rice and broken rice, while available for food use, are not adapted for use in the manufacture of flakes because of the small size of the flake that would result.

The present invention permits of the making of a resultant product of a desirable thickness and yet of a puffed-up character or with a flat, bubbly surface and of a size much larger than that resulting by the ordinary flaking method even where the larger size kernels of rice are employed. With the present invention small particles of rice and broken rice, as well as whole kernels of any size, may be combined together to form relatively long flat ribbons of food which may be puffed and toasted to produce a puffed rice food product. These long flat ribbons provide a novel and attractive type of ready-to-eat cereal different from anything which has previously been offered to the public.

In the manufacture of this product many of the commercial sizes of good quality rice may be employed, including the smallest kernels as well as small particles or broken pieces, the ordinary kernel size not being essential to the quality of the finished product. It is further possible to combine with the rice a certain amount of bran, which bran may be that from rice or wheat or other cereals, this bran being for the purpose of improving the laxative qualities of the food, and also for increasing the mineral constituents thereof.

In the preparation of the product herein contemplated rice is mixed with a flavoring preparation which may consist of a solution of sugar, salt and water, with or without the addition of bran. The rice with its flavoring material is cooked by any desired means, as, for example, in a rotary steam cooker under pressure. When thoroughly cooked the rice is partially dried or to an extent necessary to give it a tough, rubbery consistency. It is then ground into small particles about ⅛ of an inch to 1/16 of an inch diameter. The ground product is then tempered if desired in order to effect a uniform distribution of moisture after which it is ready for forming into ribbons. The ribboning machine may consist of two revolving rolls, one or both of which are grooved so as to form continuous ribbons. When both rolls are grooved they may be so made that the fins of one roll alternate with the fins of the other roll, thus forming a unit providing a definite width of ribbon determined by the width of the grooves cut in the rolls but permitting variation in the thickness of the ribbon by varying the center-line distance between the rolls.

In operation the rolls are so set as to maintain the desired separation, say 1/64 to 1/32 inch free space. The ground rice treated as heretofore stated issues from the rolls as a series of long, continuous ribbons of smooth surface and uniform width and thickness. From the rolls the ribbons pass to and upon a long belt conveyor which conveys the rice from the rolls as a loose, ribboned mass. During this conveying operation the rice ribbons are subjected to a blast of warm air in order to dry the same and make them hard and brittle. Other means of conveying the rice from the ribbon-forming rolls and of drying the rice ribbons may, of course, be employed. After this drying operation the dried ribbons of rice are passed through a suitable breaker to break up the ribbons into shorter lengths which fragments are passed to a rotary toasting oven or given other suitable treatment to produce the final product.

Where such a toasting oven is employed the food is subjected to a temperature of about 450° to 600° F. so that as the fragments are toasted they are also puffed up and greatly enlarged, thus producing a highly puffed, delicate crisped ribbon of food which is cooked, flavored and ready to eat. Moreover, this crispness is retained regardless of atmospheric conditions and the fragments do not break down and become mushy when milk and cream are added thereto.

In order to more clearly set forth one specific example of method of manufacture reference is made to the accompanying drawing in which—

Figure 1 illustrates diagrammatically suitable apparatus which may be employed for carrying out the process;

Fig. 2 is a perspective view of the ribbon-like character of the rice as it issues from the ribboning rolls;

Fig. 3 is a perspective view on a greatly enlarged scale of the final product after being puffed and toasted;

Fig. 4 is a greatly enlarged cross-section of the final product; and

Fig. 5 is a fragmentary sectional view of adjacent portions of the rolls.

Referring to Figure 1 and describing one method by which the final product contemplated hereby may be produced, 100 pounds of rice are placed in a rotary steam cooker 1 fed from a suitable bin or container 2. A solution of water, salt and sugar is supplied to the rice in the cooker from a container 3. In the specific example given with 100 pounds of rice to be treated, the proportions of the flavoring material are 4½ gallons of water, 2 pounds of salt and 6 pounds of sugar. The proportions of salt and sugar may be modified as desired to suit the taste and other flavoring elements may be used as desired. The rice is cooked under 15 pounds of steam pressure in the cooker 1 for about one hour or until the rice is thoroughly cooked. The cooked rice is then transferred to a drier 4 where it is cooled and dried to an extent necessary to make the grains or particles of a tough, rubbery nature. The rice is then passed through a grinder 5 where it is reduced to pieces about $\frac{1}{16}$ inch to $\frac{1}{8}$ inch in diameter. Any suitable grinder may be used for this purpose. After the grinding of the rice it is run to a storage bin 6 where the rice is held until it assumes a uniform moisture content.

The rice is then fed between the ribboning rolls 7. As shown in Fig. 5, the annular projections 10 of one roll fit into the annular depressions or grooves 11 of the other roll, the distance between the outer surface of the projecting part and the bottom surface of the depression determining the thickness of the ribbon, and the width of the depression 11 and projection 10, determining the width of the ribbon. During this operation the rice assumes a doughlike consistency and emerges from the rolls in the form of continuous ribbons, usually of ⅜ inch width and 1/64 to $\frac{1}{32}$ inch thick. The ribbons as they emerge from the ribboning rolls drop upon a belt conveyor 8 by which the ribbons are fed to a suitable breaker 9. The conveyor 8 passes through a drying oven and by the time the ribbons reach the end of the conveyor they are very brittle to the touch. After passing through the breaker 9 where the ribbons are broken into elongated fragments, these fragments are fed to a rotary toaster wherein they are subjected to a temperature of about 450° to 600° F. During this toasting operation the fragments become puffed so as to present a bubbly cross-section and are also toasted to the desired brown color.

One of the final toasted, puffed fragments is illustrated in Fig. 3, and a cross-section of the same is shown in Fig. 4. It will be understood, of course, that the final pieces or fragments are not uniform in size or cross-section. There is no regularity in the cross-sectional structure of the final fragments and Figs. 3 and 4 are designed merely to give a general idea of the final puffed product.

If desired bran may be added to the rice in suitable proportions without otherwise changing the final product or the method of making the same. Moreover, various modifications may be made in the method and any suitable apparatus may be employed for carrying out the various steps of the process.

I claim:

1. A process of making a ready-to-eat cereal food, comprising cooking rice in moisture, partially drying the cooked rice, reducing the rice to coarse particles, forming the particles into ribbon-like masses, drying the masses until hard and brittle, and then puffing the ribbon-like masses.

2. A process of making a ready-to-eat cereal food, comprising cooking in moisture rice units, as whole kernels and/or broken kernels, partially drying the cooked rice, reducing the rice to coarse particles, forming the particles into ribbon-like masses, drying such masses until hard and brittle, and puffing the ribbon-like masses.

3. A process of making a ready-to-eat cereal food, comprising cooking in moisture rice, as whole kernels and/or broken kernels, partially drying the cooked rice, grinding the cooked partially dried rice into coarse particles, rolling the particles into ribbon-like masses, drying such masses until hard and brittle, and then subjecting the same to heat to puff them.

4. A process of making a ready-to-eat cereal food, comprising cooking in moisture rice, as whole kernels and/or broken kernels, partially drying the cooked rice, grinding the cooked partially dried rice into particles about $\frac{1}{16}$ to $\frac{1}{8}$ inch in diameter, forming the ground rice into a ribbon, drying the ribbon until hard and brittle, and then puffing fragments of the ribbon by subjecting the same to heat.

5. A process of making a ready-to-eat cereal food, comprising cooking rice, as whole kernels and/or broken kernels, in flavoring material and water, drying the cooked rice until it assumes a tough and rubbery condition, grinding the rice into particles about $\frac{1}{16}$ to $\frac{1}{8}$ inch in diameter, rolling the ground rice into ribbon-like masses, severing the ribbon-like masses into elongated fragments and drying the same until hard and brittle, and subjecting the fragments to heat to puff the same.

EUGENE H. McKAY.

CERTIFICATE OF CORRECTION.

Patent No. 1,946,803. February 13, 1934.

EUGENE H. McKAY.

It is hereby certified that error appears in the printed specification of the above numbered patent requiring correction as follows: Page 2, line 100, claim 1, for "driving" read drying; and that the said Letters Patent should be read with this correction therein that the same may conform to the record of the case in the Patent Office.

Signed and sealed this 24th day of April, A. D. 1934.

Bryan M. Battey (Seal) Acting Commissioner of Patents.